United States Patent
Chiu

(10) Patent No.: US 10,649,555 B2
(45) Date of Patent: May 12, 2020

(54) INPUT INTERFACE DEVICE, CONTROL METHOD AND NON-TRANSITORY COMPUTER-READABLE MEDIUM

(71) Applicant: HTC Corporation, Taoyuan (TW)

(72) Inventor: Wei-Cheng Chiu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/145,131

(22) Filed: Sep. 27, 2018

(65) Prior Publication Data

US 2019/0094997 A1 Mar. 28, 2019

Related U.S. Application Data

(60) Provisional application No. 62/564,259, filed on Sep. 28, 2017.

(51) Int. Cl.
| | | |
|---|---|---|
| G06F 3/048 | (2013.01) | |
| G06F 3/02 | (2006.01) | |
| G06F 3/044 | (2006.01) | |
| G06F 1/16 | (2006.01) | |
| A63F 13/00 | (2014.01) | |
| G06F 3/041 | (2006.01) | |
| G06F 3/0354 | (2013.01) | |
| G06F 3/0338 | (2013.01) | |
| G06F 3/01 | (2006.01) | |
| G06F 3/038 | (2013.01) | |
| G06F 3/0488 | (2013.01) | |
| G06F 3/0346 | (2013.01) | |

(52) U.S. Cl.
CPC .......... *G06F 3/03547* (2013.01); *G06F 3/011* (2013.01); *G06F 3/017* (2013.01); *G06F 3/038* (2013.01); *G06F 3/0338* (2013.01); *G06F 3/0346* (2013.01); *G06F 3/0383* (2013.01); *G06F 3/0414* (2013.01); *G06F 3/0418* (2013.01); *G06F 3/04886* (2013.01)

(58) Field of Classification Search
CPC ...... G06F 3/01–04883; G06F 17/2247; G06K 7/0008

See application file for complete search history.

(56) References Cited

U.S. PATENT DOCUMENTS

2001/0011995 A1* 8/2001 Hinckley ................ A63F 13/06
 345/156
2002/0191029 A1* 12/2002 Gillespie ............... G06F 3/0481
 715/810

(Continued)

*Primary Examiner* — Lin Li
(74) *Attorney, Agent, or Firm* — CKC & Partners Co., LLC

(57) ABSTRACT

An input interface device includes a sensing panel, a touch sensor, an auxiliary sensor and a processor. The touch sensor is configured to detect a first touch event located in a first area of the sensing panel, and detect a second touch event located in a second area of the sensing panel. The first area and the second area are separated by a first boundary defined across the sensing panel. The auxiliary sensor is configured to detect a first environmental parameter. The processor is configured to determine whether the first boundary needs to be adjusted or not according to the first environmental parameter. The processor is also configured to selectively adjust the first boundary according to the first touch event and the second touch event, and the first boundary after adjustment is utilized to separate the first area and the second area.

21 Claims, 9 Drawing Sheets

(56) References Cited

U.S. PATENT DOCUMENTS

| | | | | |
|---|---|---|---|---|
| 2007/0176906 A1* | 8/2007 | Warren | G06F 3/04883 | 345/173 |
| 2009/0153470 A1* | 6/2009 | Chen | G06F 1/1624 | 345/156 |
| 2009/0195959 A1* | 8/2009 | Ladouceur | G06F 3/0202 | 361/283.1 |
| 2011/0234522 A1* | 9/2011 | Lin | G06F 3/04883 | 345/173 |
| 2012/0146903 A1* | 6/2012 | Arihara | G06F 3/011 | 345/158 |
| 2013/0342494 A1* | 12/2013 | Feng | G06F 3/044 | 345/174 |
| 2014/0281908 A1* | 9/2014 | Kim | G06F 17/2247 | 715/234 |
| 2015/0177980 A1* | 6/2015 | Yanase | G06F 3/04883 | 345/174 |
| 2016/0139702 A1* | 5/2016 | Franklin | G06F 3/044 | 345/174 |
| 2016/0224149 A1* | 8/2016 | Kang | G06F 3/044 | |
| 2018/0232101 A1* | 8/2018 | Fotopoulos | G06F 3/0418 | |
| 2018/0329500 A1* | 11/2018 | Kim | G06F 3/01 | |

\* cited by examiner

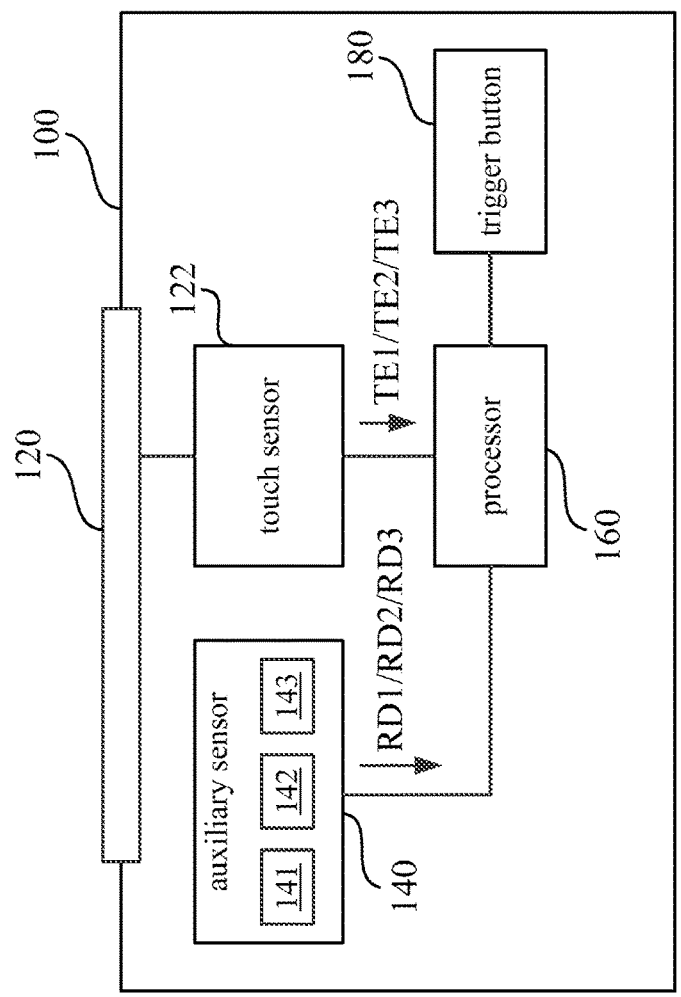
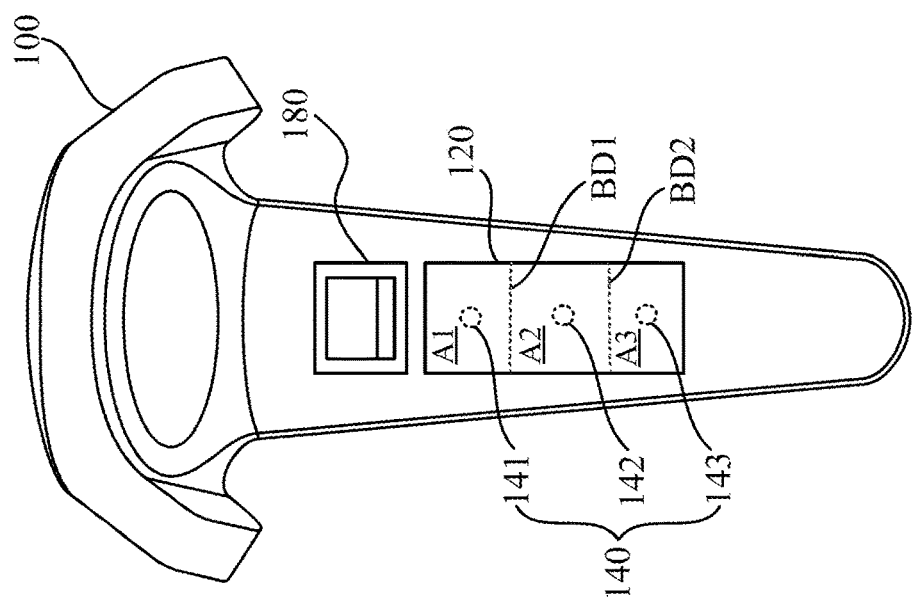
FIG. 3B
FIG. 3A

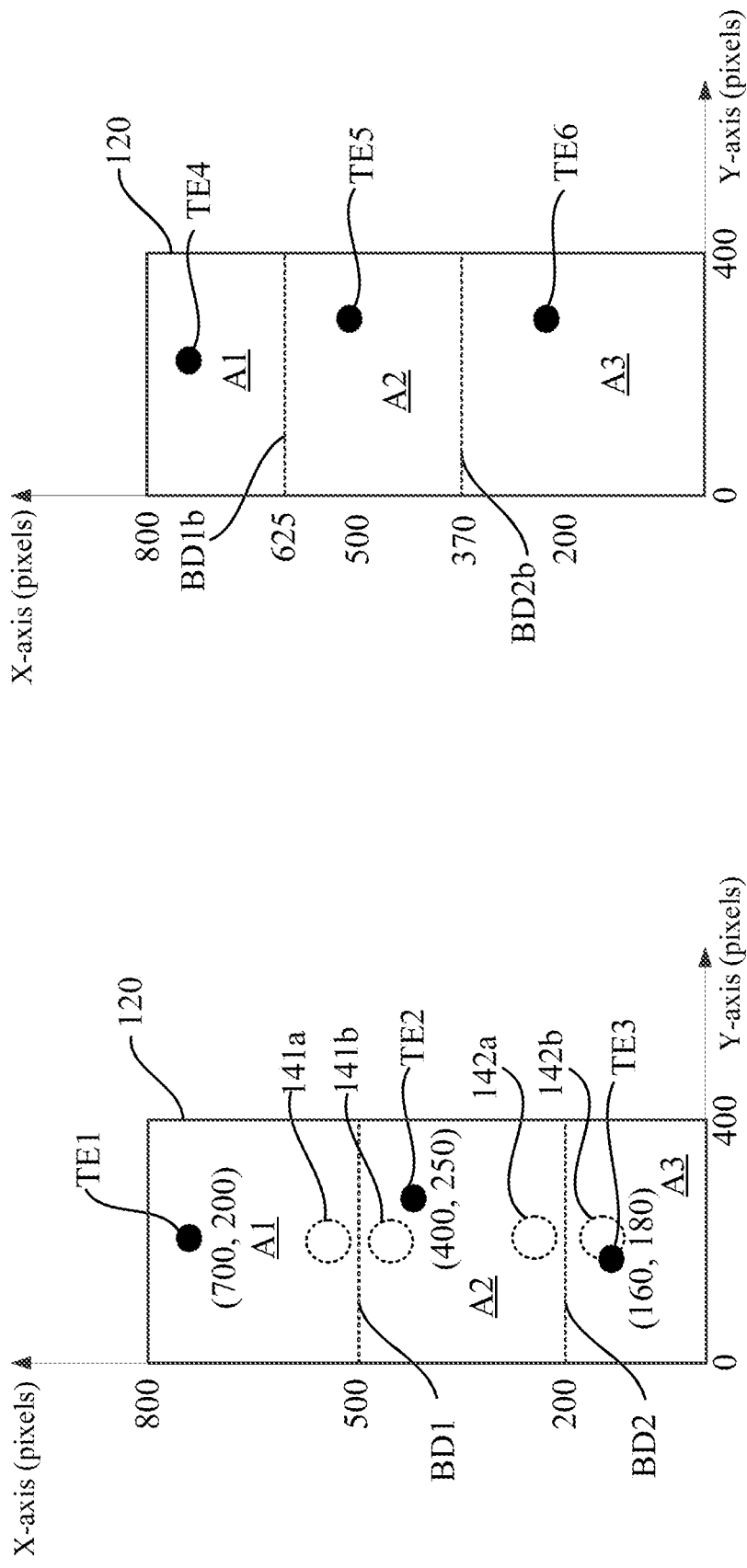

US 10,649,555 B2

INPUT INTERFACE DEVICE, CONTROL METHOD AND NON-TRANSITORY COMPUTER-READABLE MEDIUM

CROSS-REFERENCE TO RELATED APPLICATION

This application claims priority to U.S. Provisional Application Ser. No. 62/564,259, filed on Sep. 28, 2017, which is herein incorporated by reference.

BACKGROUND

Field of Invention

Present disclosure relates to an input interface device and a control method thereof. More particularly, the present disclosure relates to an input interface device capable of recognizing touch events induced by fingers.

Description of Related Art

Recently, applications for virtual reality (VR), augmented reality (AR), substitutional reality (SR) or mixed reality (MR) experiences are well developed. One important feature of the VR, AR, SR or MR system is to provide interaction experiences (including touches, hand gestures, body movements, visions, sounds and/or smells) as real as possible to a user. To achieve a real interaction experience, it is important to track movements performed by a user, and generate a proper feedback corresponding to the movements. A hand gesture performed by the user is one of the important movements to track.

SUMMARY

An embodiment of the disclosure provides an input interface device, which includes a sensing panel, a touch sensor, an auxiliary sensor and a processor. The touch sensor is configured to detect a first touch event located in a first area of the sensing panel, and detect a second touch event located in a second area of the sensing panel. The first area and the second area are separated by a first boundary defined across the sensing panel. The auxiliary sensor is disposed adjacent to the sensing panel. The auxiliary sensor is configured to detect an auxiliary input, which includes a first environmental parameter. The processor is coupled to the touch sensor and the auxiliary sensor. The processor is configured to determine whether the first boundary needs to be adjusted or not according to the first environmental parameter. The processor is also configured to selectively adjust the first boundary according to the first touch event and the second touch event. The processor is also configured to utilize the first boundary after adjustment to separate the first area and the second area.

Another embodiment of present disclosure is to provide a control method, which is suitable for an input interface device including a sensing plane. The control method include following operations. A first touch event located in a first area of the sensing panel and a second touch event located in a second area of the sensing panel are detected. The first area and the second area are separated by a first boundary defined across the sensing panel. An auxiliary input including a first environmental parameter is detected. Whether the first boundary is needed to be adjusted or not is determined according to the first environmental parameter. The first boundary is selectively adjusted according to the first touch event and the second touch event. The first boundary after adjustment is utilized to separate the first area and the second area.

Another embodiment of present disclosure is to provide a non-transitory computer-readable medium including computer program instructions. The computer program instructions when executed by a processor cause the processor to perform following operations. A first touch event located in a first area of a sensing panel and a second touch event located in a second area of the sensing panel are detected. The first area and the second area are separated by a first boundary defined across the sensing panel. An auxiliary input including a first environmental parameter is detected. Whether the first boundary is needed to be adjusted or not is determined according to the first environmental parameter. The first boundary is selectively adjusted according to the first touch event and the second touch event. The first boundary after adjustment is utilized to separate the first area and the second area.

It is to be understood that both the foregoing general description and the following detailed description are by examples, and are intended to provide further explanation of the disclosure as claimed.

BRIEF DESCRIPTION OF THE DRAWINGS

Present disclosure can be more fully understood by reading the following detailed description of the embodiment, with reference made to the accompanying drawings as follows:

FIG. 3A is a side view diagram illustrating a bottom side of the input interface device according to some other embodiments.

FIG. 3B is a function block diagram illustrating the interface device according to some embodiments in FIG. 3A.

FIG. 9 is a schematic diagram illustrating a sensing plane of the input interface device shown in FIG. 8.

FIG. 10 is a schematic diagram illustrating the sensing plane after the boundaries are adjusted according to some embodiments of the disclosure.

DETAILED DESCRIPTION

Figure 1:
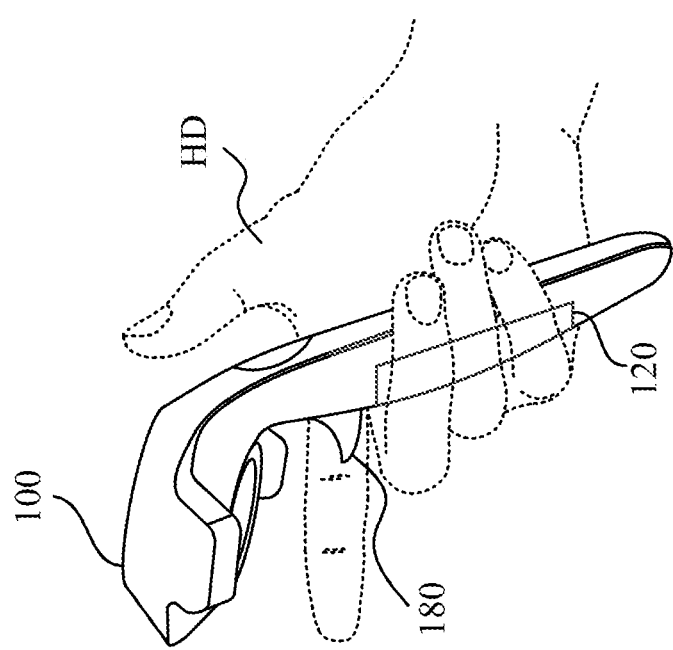
FIG. 1 is a schematic diagram illustrating an input interface device according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

Reference is made to FIG. 1. FIG. 1 is a schematic diagram illustrating an input interface device 100 according to some embodiments of the present disclosure. As illustrated in FIG. 1, in one embodiment, the input interface device 100 can be hold by one hand HD of a user. In some embodiments, the input interface device 100 can be a hand-held controller, a joystick or a remote controller of a virtual reality (VR), an augmented reality (AR), a substitutional reality (SR), a mixed reality (MR) system, a gaming console, a computer or any similar electronic system.

In the embodiments illustrated in FIG. 1, the input interface device 100 includes a sensing plane 120. User's finger may touch and contact on the sensing plane 120. The input interface device 100 may detect a finger gesture of user's hand HD by monitoring a touch input on the sensing plane 120. In the embodiment shown in FIG. 1, the sensing plane 120 is utilized to sense finger gestures (e.g., pressing down, holding tight, contacting or released) performed by each of a middle finger, a ring finger and a pinky finger of the user's hand HD.

In the embodiment shown in FIG. 1, a gesture of a point finger on the hand HD can be detected by a trigger button. However, the disclosure is not limited thereto. In some other embodiments, the sensing plane (not shown in figures) can extended upward to cover an area corresponding to the point finger, and in this case, the sensing plane can be utilized to detect finger gestures including more fingers. The sensing plane 120 can be utilized to detect finger gestures including more fingers. In the following embodiments, the sensing plane 120 corresponding to the middle finger, the ring finger and the pinky finger is discussed for demonstration.

Figure 2B:
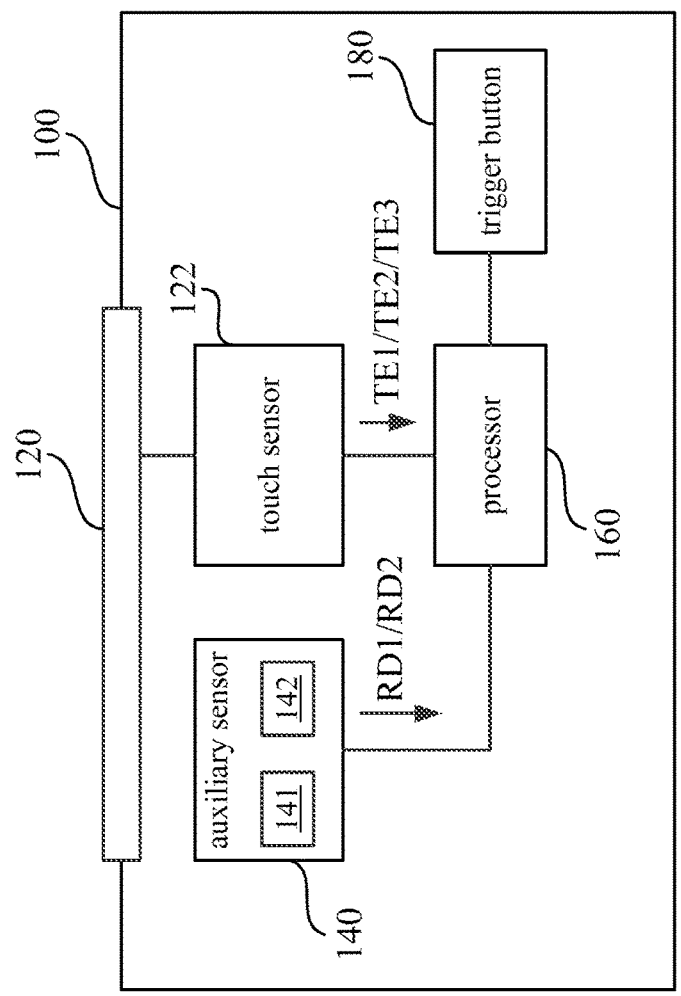
FIG. 2B is a function block diagram illustrating the interface device according to some embodiments in FIG. 2A.
Figure 2A:
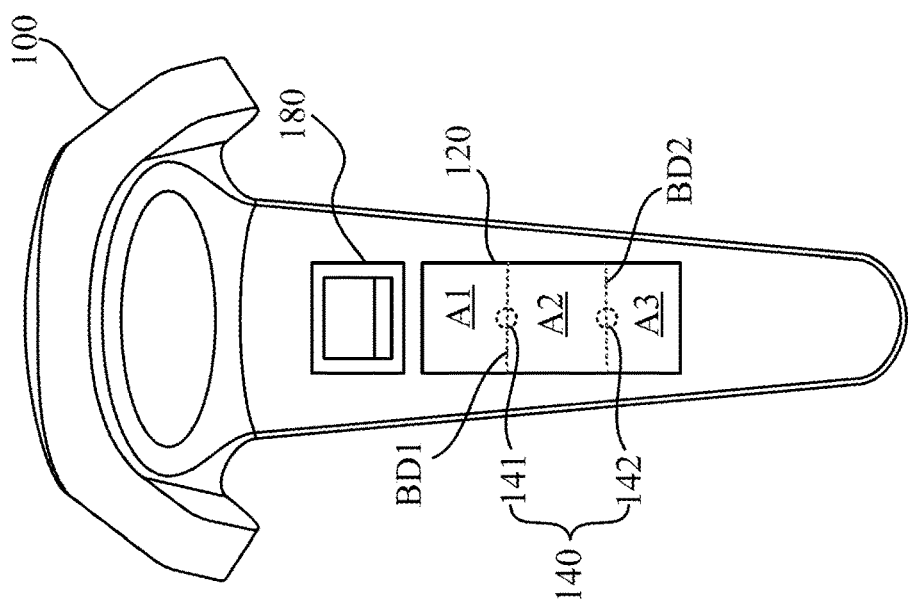
FIG. 2A is a side view diagram illustrating a bottom side of the input interface device according to some embodiments of the present disclosure.

Reference is further made to FIG. 2A and FIG. 2B. FIG. 2A is a view diagram illustrating a bottom side of the input interface device 100. FIG. 2B is a function block diagram illustrating the interface device 100. As shown in FIG. 2B, the input interface device 100 includes the sensing plane 120, a touch sensor 122, an auxiliary sensor 140, a processor 160 and the trigger button 180.

Figure 5:
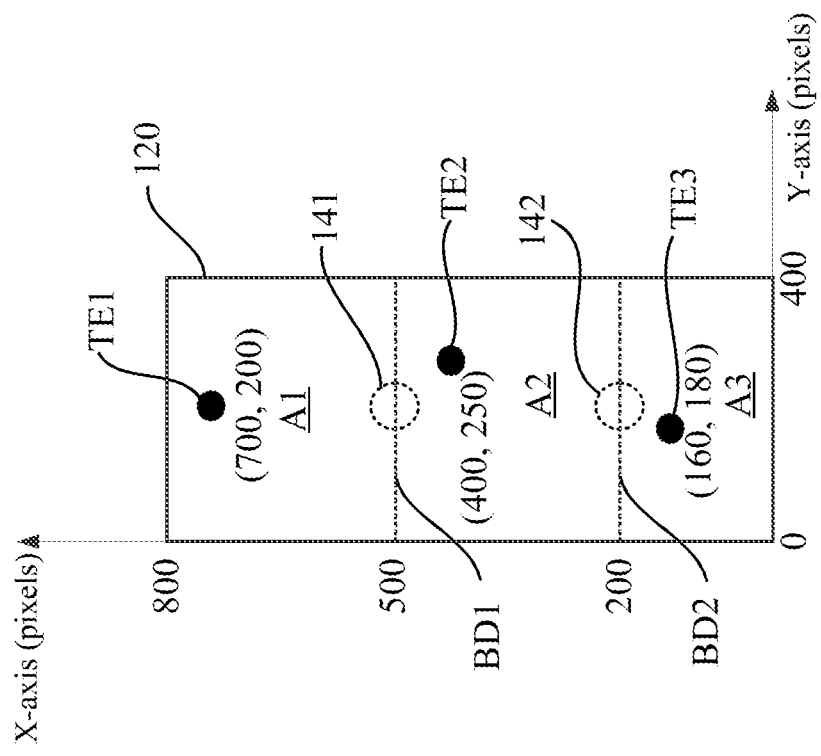
FIG. 5 is a schematic diagram illustrating the sensing plane according to some embodiments of the disclosure.

In the embodiment shown in FIG. 2A, in order to detect and distinguish gestures of multiple fingers (e.g., the middle finger, the ring finger and the pinky finger) individually on the sensing plane 120, the sensing plane 120 are divided into different areas separated by virtual boundaries, and touch events detected in different areas can be recognized correspondingly to different fingers. As shown in FIG. 2A, the sensing plane 120 is divided into three areas A1, A2 and A3. The first area A1, the second area A2 and the third area A3 are located at different segments along a first directional axis (X-axis as shown in FIG. 5). The area A1 is located at the segment X=500 to X=800. The area A2 is located at the segment X=200 to X=500. The area A3 is located at the segment X=0 to X=200. Areas A1 and A2 are separated by a first boundary BD1 defined across the sensing panel 120.

The first boundary BD1 extends in a direction in parallel with a second directional axis, Y-axis, which is a horizontal directional axis perpendicular to the X-axis as illustrated in the FIG. 5. Areas A2 and A3 are separated by a second boundary BD2 defined across the sensing panel. The second boundary BD2 extends along in a direction in parallel with the second directional axis, Y-axis, as illustrated in the FIG. 5. In this case, the first area A1 is located on a top side of the sensing plane 120 and corresponds to the middle finger. The second area A2 is located in the middle of the sensing plane 120 and corresponds to the ring finger. The third area A3 is located in a bottom side of the sensing plane 120 and corresponds to the pinky finger. The boundaries BD1 and BD2 are parallel to each other defined across the sensing panel 120 in a horizontal direction.

In some embodiments, the sensing plane 120 includes three areas A1, A2 and A3 for three different fingers, but the disclosure is not limited thereto. In some other embodiments, the sensing plane of the input interface device 100 may have only two areas, such as the areas A1 and A2, or the areas A2 and A3 defined on the sensing plane 120. In this case, the input interface device 100 may sense finger gestures of at least two fingers, such as the middle finger and the ring finger, or the ring finger and the pinky finger.

The touch sensor 122 is coupled to the sensing plane 120. The touch sensor 122 is configured to detect a first touch event TE1 located in the first area A1, a second touch event TE2 located in the second area A2 and a third touch event TE3 in the third area A3. When the first touch event TE1 is detected, the touch sensor 122 determines that the middle finger currently contacts on the sensing plane 120 (e.g., the user grips the input interface device 100 with the middle finger). When the first touch event TE1 is not detected, the touch sensor determines that the middle finger currently releases and is away from the sensing plane 120. In a similar way, the second touch event TE2 and the third touch event TE3 can be utilized to determine the finger gestures of the ring finger and the pinky finger. In some embodiments, the touch sensor 122 can be a capacitive touch sensor, a resistive touch sensor, an optical touch sensor or any equivalent touch circuit.

In some embodiments, when the input interface device 100 starts to detect the first touch event TE1, the second touch event TE2 and the third touch event TE3, the boundaries BD1 and BD2 are initially defined at default positions. The touch sensor 122 refers the boundaries BD1 and BD2 at the default positions to recognize the first touch event TE1, the second touch event TE2 and the third touch event TE3 before the boundaries BD1 and BD2 are adjusted.

In some applications, different users may have their own preference about how to hold the input interface device 100. For example, some users with smaller hands may trigger the touch events TE1-TE3 located on an upper part of the sensing plane 120. Some users with bigger hands may trigger the touch events TE1-TE3 with bigger gaps between each other and located over the whole surface of the sensing plane 120. It is not optimal to detect the finger gesture for all different users with fixed boundaries BD1 and BD2. Especially, when a touch event is located near the boundary, it is difficult for the touch sensor 122 to match the touch event to a proper finger. In some embodiments, the input interface device 100 is able to dynamically adjust the first boundary BD1 and the second boundary BD2.

As shown in FIG. 2A and FIG. 2B, the input interface device 100 includes the auxiliary sensor 140. The auxiliary sensor 140 is disposed adjacent to the sensing panel 120 and configured to detect an auxiliary input (e.g., environmental parameters RD1 and RD2). In some embodiments shown in FIG. 2A and FIG. 2B, the auxiliary sensor 140 includes two auxiliary sensor components 141 and 142. The auxiliary sensor component 141 is disposed on the sensing panel 120 and adjacent to the first boundary BD1. The auxiliary sensor component 141 is configured to detect a first environmental parameter RD1 around the first boundary BD1. The auxiliary sensor component 142 is disposed on the sensing panel 120 and adjacent to the second boundary BD2. The auxiliary sensor component 142 is configured to detect a second environmental parameter RD2 around the second boundary BD2.

In some embodiments, the auxiliary sensor components 141 and 142 can be a first proximity sensor component and a second proximity sensor component disposed respectively adjacent to the first boundary BD1 and the second boundary BD2. The first proximity sensor component is configured to generate a first proximity reading as the first environmental parameter RD1. The first proximity reading (i.e., the first environmental parameter RD1) is negatively correlated with a distance between the sensing plane 120 and a finger in front of the proximity sensor component (i.e., the auxiliary sensor component 141). If the finger is closer to the auxiliary sensor component 141, the first proximity reading will be higher. If the finger is farer from the auxiliary sensor component 141, the first proximity reading will be lower. The second proximity sensor component is configured to generate a second proximity reading as the second environmental parameter RD2. The second proximity reading (i.e., the second environmental parameter RD2) is negatively correlated with a distance between the sensing plane 120 and a finger in front of the proximity sensor component (i.e., the auxiliary sensor component 142).

In some other embodiments, the auxiliary sensor components 141 and 142 can be a first temperature sensor component and a second temperature sensor component disposed respectively adjacent to the first boundary BD1 and the second boundary BD2. The first temperature sensor component is configured to generate a first temperature reading as the first environmental parameter RD1. The first temperature reading (i.e., the first environmental parameter RD1) is positively correlated with a temperature on the sensing plane 120 around the first boundary BD1. In general, a body temperature is usually higher than an environmental temperature. If the finger is closer to the auxiliary sensor component 141, the auxiliary sensor component 141 will receive the temperature from the finger, such that the first temperature reading will be higher. If the finger is farer from the auxiliary sensor component 141, the first temperature reading will be lower. The second temperature sensor component is configured to generate a second temperature reading as the second environmental parameter RD2 around the second boundary BD2.

In some other embodiments, the auxiliary sensor components 141 and 142 can be a first grip sensor component and a second grip sensor component disposed respectively adjacent to the first boundary BD1 and the second boundary BD2. The first grip sensor component is configured to generate a first pressure reading as the first environmental parameter RD1. The first pressure reading (i.e., the first environmental parameter RD1) is positively correlated with an external force applied on the sensing plane 120 around the first boundary BD1. If the finger is closer to the auxiliary sensor component 141, the auxiliary sensor component 141 will detect the force from the finger, such that the first pressure reading will be higher. If the finger is farer from the auxiliary sensor component 141, the first pressure reading will be lower. The second temperature sensor component is configured to generate a second pressure reading as the second environmental parameter RD2 around the second boundary BD2.

In aforesaid embodiments shown in FIG. 2A and FIG. 2B, the auxiliary sensor 140 includes two auxiliary sensor components 141 and 142 located respectively around the first boundary BD1 and the second boundary BD2. However, the disclosure is not limited thereto. In some other embodiments, the auxiliary sensor may include one sensor component for each one of the areas on the sensing panel.

Reference is further made to FIG. 3A and FIG. 3B. FIG. 3A is a view diagram illustrating a bottom side of the input interface device 100 according to some other embodiments. FIG. 3B is a function block diagram illustrating the interface device 100 in FIG. 3A. As some embodiments shown in FIG. 3A and FIG. 3B, the auxiliary sensor 140 includes three auxiliary sensor components 141, 142 and 143. The auxiliary sensor component 141 is disposed in the first area A1 of the sensing panel 120. The auxiliary sensor component 141 is configured to detect a first environmental parameter RD1 corresponding to the first area A1. The auxiliary sensor component 142 is disposed in the second area A2 of the sensing panel 120. The auxiliary sensor component 142 is configured to detect a second environmental parameter RD2 corresponding to the second area A2. The auxiliary sensor component 143 is disposed in the third area A3 of the sensing panel 120. The auxiliary sensor component 143 is configured to detect a third environmental parameter RD3 corresponding to the second area A3. In the embodiments shown in FIG. 3A and FIG. 3B, the auxiliary sensor 140 is able to generate the environmental parameters RD1-RD3 corresponding to each of the areas A1-A3.

In some embodiments, the processor 160 is coupled to the touch sensor 122 and the auxiliary sensor 140. The processor 160 is utilized to dynamically adjust the first boundary BD1 and the second boundary BD2 to optimize the touch sensing performance on the input interface device 100. The processor 160 can be implemented by a central processing unit (CPU), an application-specific integrated circuit (ASIC) or any equivalent control circuit. Details about when and how to adjust the first boundary BD1 and the second boundary BD2 are explained in following embodiments.

Figure 4:
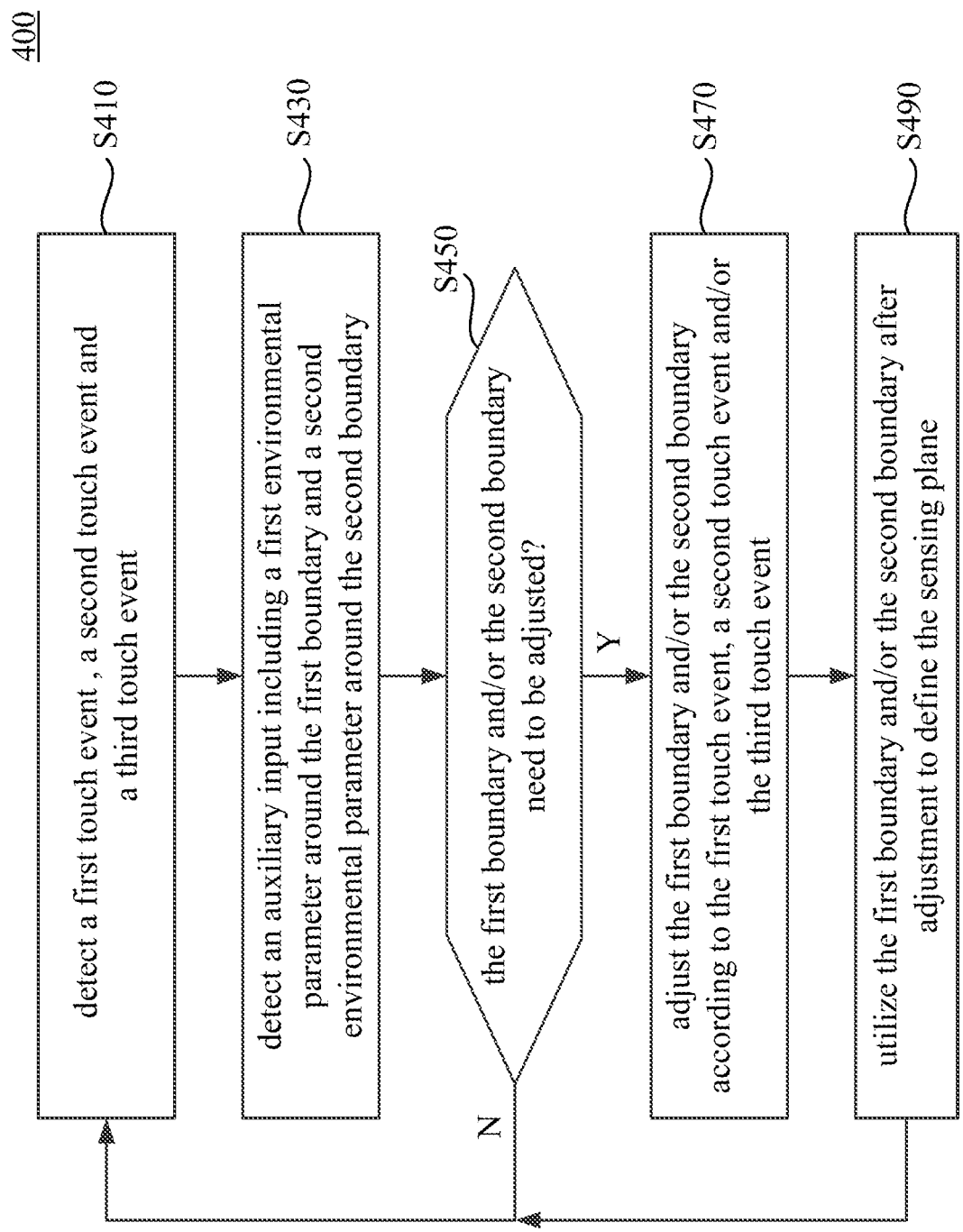
FIG. 4 is a flow diagram illustrating a control method according to some embodiments of the disclosure.

Reference is further made to FIG. 4 and FIG. 5. FIG. 4 is a flow diagram illustrating a control method 400 according to some embodiments of the disclosure. FIG. 5 is a schematic diagram illustrating the sensing plane 120 according to some embodiments in FIG. 2A and FIG. 2B of the disclosure. In some embodiments, the control method 400 performed on the input interface device 100 in FIG. 1, FIG. 2A and FIG. 2B is discussed for demonstration.

Referring to FIG. 5, the first boundary BD1 and the second boundary BD2 are initially defined at default positions. In the case, the first boundary BD1 is defined as a horizontal line (X=500) on the sensing plane 120, and the second boundary BD2 is defined as another horizontal line (X=200) on the sensing plane 120. As shown in FIG. 2B, FIG. 4 and FIG. 5, step S410 is performed, by the touch sensor 120, to detect a first touch event TE1 located in the first area A1 of the sensing panel 120, detect a second touch event TE2 located in the second area A2 of the sensing panel 120 and detect a third touch event TE3 located in the third area A3 of the sensing panel 120. As shown in FIG. 5, the touch sensor 120 refers the first boundary BD1 and the second boundary BD2 at the default positions to define the areas A1-A3 and recognize the first touch event TE1, the second touch event TE2 and the third touch event TE3, before the first boundary BD1 and the second boundary BD2 are adjusted.

In some embodiments shown in FIG. 2B, FIG. 4 and FIG. 5, step S430 is performed, by the auxiliary sensor 140, to detect an auxiliary input including the first environmental parameter RD1 around the first boundary BD1 and the second environmental parameter RD2 around the second boundary BD2. Afterward, step S450 is performed, by the processor 160, to determine whether the first boundary BD1 needs to be adjusted or not according to the first environmental parameter RD1 and whether the second boundary BD2 needs to be adjusted or not according to the second environmental parameter RD2.

In some other embodiments shown in FIG. 3B and FIG. 4, step S450 is performed, by the processor 160, to determine whether the first boundary BD1 needs to be adjusted or not according to both of the environmental parameters RD1 and RD2 generated by the auxiliary sensor components 141 and 142. In addition, step S450 is performed, by the processor 160, to determine whether the second boundary BD2 needs to be adjusted or not according to both of the environmental parameters RD2 and RD3 generated by the auxiliary sensor components 142 and 143.

Figure 7A:
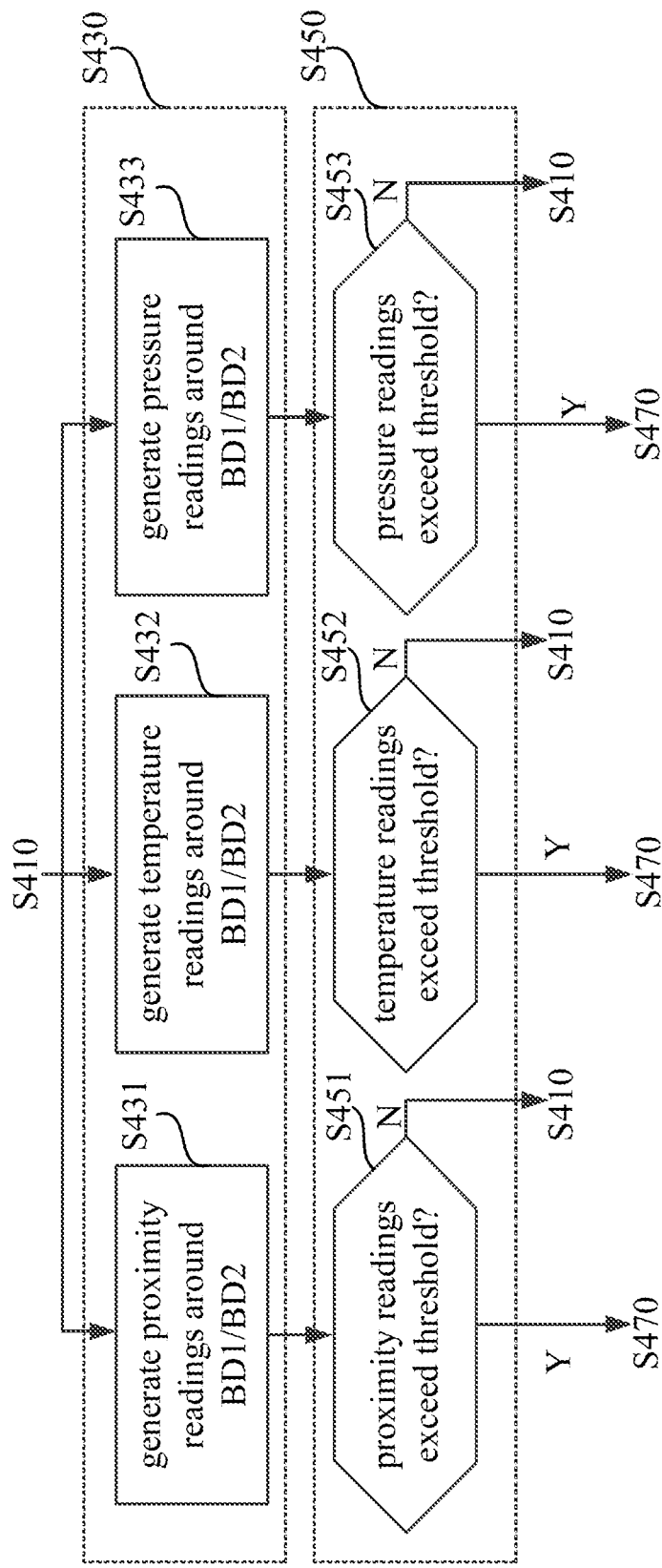
FIG. 7A is a flow chart illustrating further details about some steps shown in FIG. 4 according to some embodiments.

Reference is further made to FIG. 7A, which is a flow chart illustrating further details about steps S430 and S450 shown in FIG. 4 according to some embodiments. In some embodiments, the auxiliary sensor components 141 and 142 include a first proximity sensor component and a second proximity sensor component. Step S431 is performed to generate proximity readings by the first proximity sensor component and a second proximity sensor component around the boundaries BD1 and BD2. In following example, the proximity readings generated by the first proximity sensor component and the second proximity sensor are assumed to vary in a range from 1 to 100. In this case, because the second touch event TE2 is close to the boundary BD1 and the third touch event TE3 is relatively closer to the boundary BD2, the proximity reading generated by the auxiliary sensor components 141 is "65" (which is high because the second touch event TE2 is close to the boundary BD1), and the proximity reading generated by the auxiliary sensor components 142 is "80" (which is higher because the third touch event TE3 is relatively closer to the boundary BD2). Step S451 is performed, by the processor 160, to compare the proximity readings with a proximity threshold value so as to determine whether the first boundary BD1 and the second boundary BD2 need to be adjusted or not. It is assumed that the proximity threshold value is set at "50". The first boundary BD1 will be determined as need to be adjusted (65>50). The second boundary BD2 will be determined as need to be adjusted (80>50).

In some embodiments, the auxiliary sensor components 141 and 142 include a first temperature sensor component and a second temperature sensor component. Step S432 is performed to generate temperature readings by the first temperature sensor component and a second temperature sensor component around the boundaries BD1 and BD2. In this case, because the second touch event TE2 is close to the boundary BD1 and the third touch event TE3 is relatively closer to the boundary BD2, the temperature reading generated by the auxiliary sensor components 141 is "33" (which is high because the second touch event TE2 is close to the boundary BD1), and the temperature reading generated by the auxiliary sensor components 142 is "37" (which is higher because the third touch event TE3 is relatively closer to the boundary BD2). Step S452 is performed, by the processor 160, to compare the temperature readings with a temperature threshold value so as to determine whether the first boundary BD1 and the second boundary BD2 need to be adjusted or not. It is assumed that the temperature threshold value is set at "32". The first boundary BD1 will be determined as need to be adjusted (33>32). The second boundary BD2 will be determined as need to be adjusted (37>32).

In some embodiments, the auxiliary sensor components 141 and 142 include a first grip sensor component and a second grip sensor component. Step S433 is performed to generate pressure readings by the first grip sensor component and a second grip sensor component around the boundaries BD1 and BD2. In this case, because the second touch event TE2 is close to the boundary BD1 and the third touch event TE3 is relatively closer to the boundary BD2, the pressure reading generated by the auxiliary sensor components 141 is "30" (which is high because the second touch event TE2 is close to the boundary BD1), and the pressure reading generated by the auxiliary sensor components 142 is "45" (which is higher because the third touch event TE3 is relatively closer to the boundary 45y BD2). Step S453 is performed, by the processor 160, to compare the pressure readings with a pressure threshold value so as to determine whether the first boundary BD1 and the second boundary BD2 need to be adjusted or not. It is assumed that the pressure threshold value is set at "20". The first boundary BD1 will be determined as need to be adjusted (30>20). The second boundary BD2 will be determined as need to be adjusted (45>20).

If it is determined that there is no need to adjust the first boundary BD1 and/or the second boundary BD2 (proximity readings, temperature readings or pressure readings are lower than a corresponding threshold), the control method 400 will return to step S410. In this case, the first boundary BD1 and/or the second boundary BD2 will remains at their current positions.

On the other hand, if it is determined that the first boundary BD1 and the second boundary BD2 need to be adjusted, step S470 is performed, by the processor 160 to adjust the first boundary BD1 according to the first touch event TE1 and the second touch event TE2, and/or adjust the second boundary BD2 according to the second touch event TE2 and the third touch event TE3.

In some embodiments, the boundary adjustment (i.e., S470) will be performed only when step S450 determines that all of the readings detected by the auxiliary sensor components (e.g., all of the two auxiliary sensor components 141-142 shown in FIG. 2A and FIG. 2B, or all of the three auxiliary sensor components 141-143 shown in FIG. 3A and FIG. 3B) in the auxiliary sensor 140 exceed the corresponding threshold value. In other words, in some embodiments, the boundary adjustment (i.e., S470) will not be performed if one of the readings detected by the auxiliary sensor components is lower than the corresponding threshold value.

In some other embodiments, the boundary adjustment (i.e., S470) will be performed only when all of the touch events (e.g., the touch events TE1-TE3 generated by the touch sensor 122 as shown in FIG. 2B and FIG. 3B) corresponding to the areas A1-A3 are detected. In these embodiments, the boundary adjustment (i.e., S470) will be performed only when all of the touch events TE1-TE3 are detected. In other words, in some embodiments, the boundary adjustment (i.e., S470) will not be performed if the touch sensor 122 does not detect the first touch event TE1 on the first area A1, or if the touch sensor 122 does not detect the second touch event TE2 on the second area A2, or if the touch sensor 122 does not detect the third touch event TE3 on the third area A3. In some embodiments, the boundary adjustment (i.e., S470) will not be performed when any one of the touch events TE1-TE3 is missed.

Figure 7B:
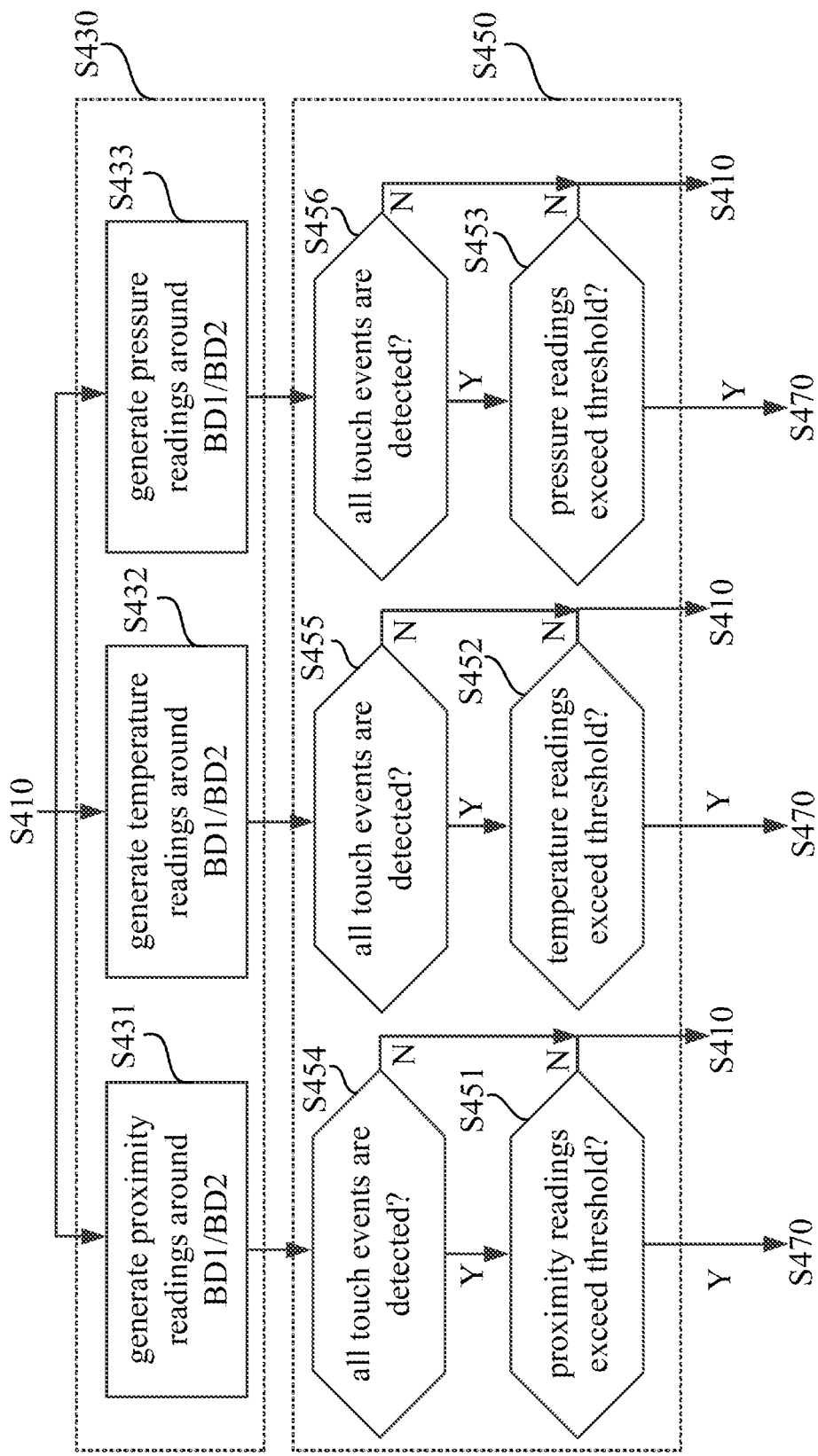
FIG. 7B is a flow chart illustrating further details about some steps shown in FIG. 4 according to some embodiments.

Reference is further made to FIG. 7B, which is a flow chart illustrating further details about steps S430 and S450 shown in FIG. 4 according to some embodiments. Compared to embodiments shown in FIG. 7A, step S450 shown in FIG. 7B further includes step S454-S456. Referring to FIG. 2B, FIG. 3B and FIG. 7B, Step S454 is performed to determine whether all of the touch events TE1-TE3 are detected by the touch sensor 122 in the area A1-A3. When all of the touch events TE1-TE3 are detected, the step S451 is performed. If one of the touch events TE1-TE3 is missed, the boundary adjustment (i.e., S470) will not be performed. In these embodiments, the boundary adjustment (i.e., S470) will be performed only when both all touch events TE1-TE3 are detected and also all of the proximity readings exceed the corresponding proximity threshold value determined in step S451.

Similarly, step S455 is performed to determine whether all of the touch events TE1-TE3 are detected by the touch sensor 122 in the area A1-A3 before step S452. The boundary adjustment (i.e., S470) will be performed only when both all touch events TE1-TE3 are detected and also all of the temperature readings exceed the corresponding temperature threshold value determined in step S452. Similarly, step S456 is performed to determine whether all of the touch events TE1-TE3 are detected by the touch sensor 122 in the area A1-A3 before step S453. The boundary adjustment (i.e., S470) will be performed only when both all touch events TE1-TE3 are detected and also all of the pressure readings exceed the corresponding pressure threshold value determined in step S453.

In these embodiments shown in FIG. 7B, the boundary adjustment (i.e., S470) will performed only when all touch events TE1-TE3 are detected and also all of the readings detected by the auxiliary sensor components (e.g., all of the two auxiliary sensor components 141-142 shown in FIG. 2A and FIG. 2B, or all of the three auxiliary sensor components 141-143 shown in FIG. 3A and FIG. 3B) in the auxiliary sensor 140 exceed the corresponding threshold value.

As shown in FIG. 5, the first touch event TE1 is detected at (700, 200) in the X-Y coordinates shown in FIG. 5. The coordinate along the X-axis of the first touch event TE1 is "700". The second touch event TE2 is detected at (400, 250) in the X-Y coordinates shown in FIG. 5. The X-coordinate along the X-axis of the second touch event TE2 is "400".

Figure 6:
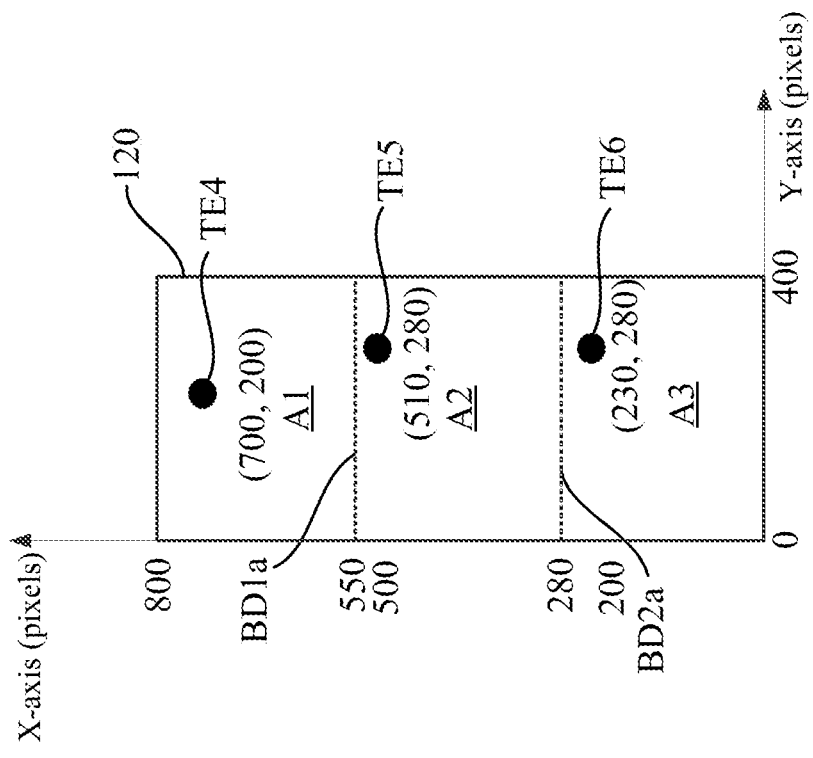
FIG. 6 is a schematic diagram illustrating the sensing plane after the boundaries are adjusted according to some embodiments of the disclosure.

In some embodiments, the processor 160 calculate an average coordinate from the X-coordinate "700" of the first touch event TE1 and the X-coordinate "400" of the second touch event TE2. In this case, the average coordinate calculated from the touch events TE1 and TE2 is equal to "550". Reference is further made to FIG. 6, which is a schematic diagram illustrating the sensing plane 120 after the boundaries are adjusted according to some embodiments of the disclosure. In this case, the first boundary BD1a after adjustment is set to X=550.

In a similar way, the processor 160 calculate an average coordinate from the X-coordinate "400" of the second touch event TE2 and the X-coordinate "160" of the second touch event TE3. In this case, the average coordinate from the touch events TE2 and TE3 is equal to "280". As shown in FIG. 6, the second boundary BD2a after adjustment is set to X=280.

In aforesaid embodiments, because the second touch event TE2 is close to the upper boundary of the area A2 and the third touch event TE3 is close to the upper boundary of the area A3, it indicates the user may have a smaller hand or the user tend to grip the input interface device 100 on the upper portion. The control method 400 dynamically adjusts the first boundary BD1a (from X=500 to X=550) and the second boundary BD2a (from X=200 to X=280) in an upward direction. Afterward, step S490 is performed, by the processor 160, to utilize the first boundary BD1a and the second boundary BD2a to define the areas A1, A2 and A3 on the sensing plane 120.

Afterward, when some following touch events (e.g., touch events TE4-TE6 shown in FIG. 6) are detected on the sensing plane 120. The touch sensor 122 will recognize the touch events TE4-TE6 according to the first boundary BD1a and the second boundary BD2a after adjustment. In this case, the touch event TE4 (700, 200) in the area A1 will be recognized corresponding to the middle finger, the touch event TE5 (510, 280) in the area A2 will be recognized corresponding to the ring finger, and the touch event TE6 (230, 280) in the area A3 will be recognized corresponding to the pinky finger.

In an example that the first boundary and the second boundary are fixed without dynamically adjustment, the touch event TE5 and the touch event TE6 may not be detected correctly. Therefore, the input interface device 100 and the control method 400 are able to elevate a preciseness of touch sensing.

In aforesaid embodiments, the processor 160 calculates an arithmetic average coordinate from two adjacent touch events to adjust the boundary, an equation of one boundary after adjustment is:

$X=(X1+X2)/2$, in which, X1 is an X-coordinate of one touch event, and X2 is another X-coordinate of the other touch event.

However, the disclosure is not limited to the arithmetic average. In some other embodiments, the processor 160 may calculate a weighted average coordinate from two adjacent touch events to adjust the boundary.

Figure 8:
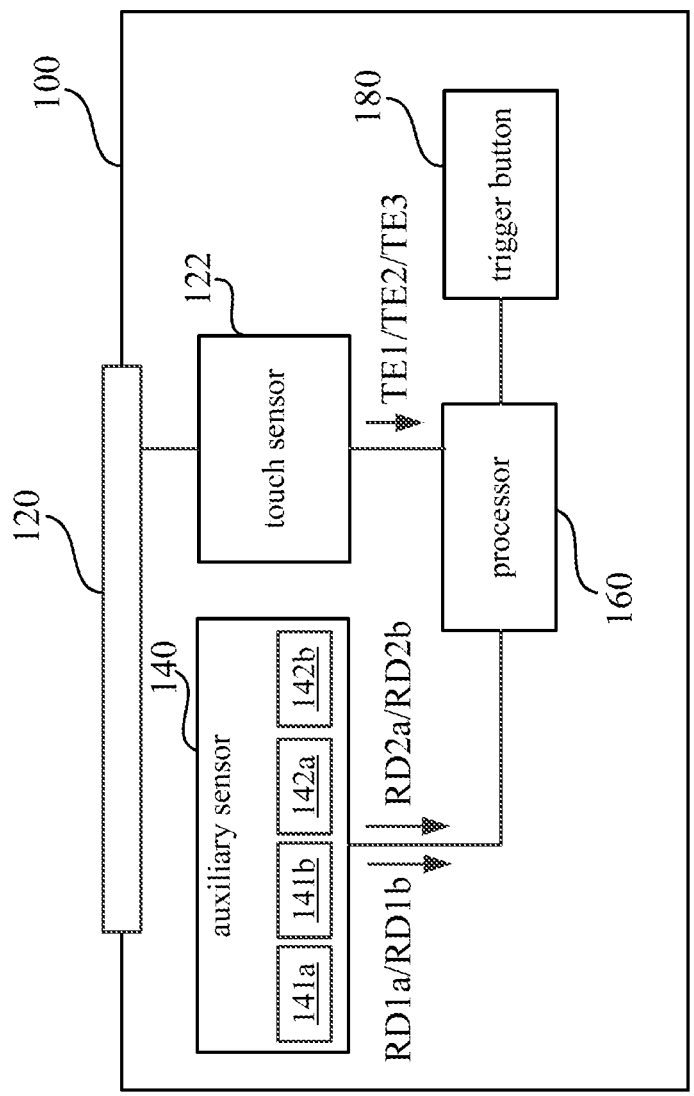
FIG. 8 is a function block diagram illustrating the input interface device according to some other embodiments.

Reference is further made to FIG. 8 and FIG. 9. FIG. 8 is a function block diagram illustrating the input interface device 100 according to some other embodiments. FIG. 9 is a schematic diagram illustrating a sensing plane 120 of the input interface device 100 shown in FIG. 8.

As shown in FIG. 8, the input interface device 100 includes the sensing plane 120, a touch sensor 122, an auxiliary sensor 140, a processor 160 and the trigger button 180. In the embodiment shown in FIG. 8, the auxiliary sensor 140 includes four auxiliary sensor components 141a, 141b, 142a and 142b. As shown in FIG. 9, the auxiliary sensor components 141a and 141b are disposed on two sides adjacent to the first boundary BD1, and the auxiliary sensor components 142a and 142b are disposed on two sides adjacent to the second boundary BD2.

In the embodiments shown in FIG. 8 and FIG. 9, the processor 160 may calculate a weighted average coordinate (to decide how to adjust the boundary BD1) according to X-coordinate "700" of the first touch event TE1, the X-coordinate "400" of the second touch event TE2 and also the first reading of the auxiliary sensor components 141a and the second reading of the of the auxiliary sensor components 141b. Reference is further made to FIG. 10, which is a schematic diagram illustrating the sensing plane 120 after adjustment in some embodiments. In some embodiments, the processor 160 calculates an weighted average coordinate from adjacent touch events TE1 and TE2 to adjust the first boundary BD1, an equation of the first boundary BD1b after adjustment is:

$X=(W1*X1+W2*X2)/(W1+W2)$, in which, X1 is an X-coordinate of one touch event TE1, and X2 is another X-coordinate of the other touch event TE2, W1 is a weight of the touch event TE1, W2 is a weight of the touch event TE2.

In some embodiment, W1 can be determined in a negatively correlated to the auxiliary reading RD1a of the auxiliary sensor components 141a, and the W2 can be determined in a negatively correlated to the auxiliary reading RD1b of the auxiliary sensor components 141b. For example, W1 can be calculated by "100" minus the auxiliary reading of the auxiliary sensor components 141a, and W2 can be calculated by "100" minus the auxiliary reading of the auxiliary sensor components 141b.

It is assumed that the a proximity value detected by the auxiliary sensor components 141a is "25" and W1 is set at "75", and a proximity value detected by the auxiliary sensor components 141b is "75" and W2 is set at "25". In this case, the first boundary BD1b after adjustment will be "X= (75*700+25*400)/(75+25)", which equals to "X=625".

In a similar way, the processor 160 calculates an weighted average coordinate from adjacent touch events TE2 and TE3 to adjust the second boundary BD2, an equation of the second boundary BD1b after adjustment is:

$X=(W2*X2+W3*X3)/(W2+W3)$, in which, X2 is an X-coordinate of one touch event TE2, and X3 is another X-coordinate of the other touch event TE3, W2 is a weight of the touch event TE2, W3 is a weight of the touch event TE3.

For example, W2 can be calculated by "100" minus the auxiliary reading RD2a of the auxiliary sensor components 142a, and W3 can be calculated by "100" minus the auxiliary reading RD2b of the auxiliary sensor components 142b. It is assumed that the a proximity value detected by the auxiliary sensor components 142a is "30" and W2 is set at "70", and a proximity value detected by the auxiliary sensor components 142b is "90" and W2 is set at "10". In this case, the second boundary BD2b after adjustment will be "X= (70*400+101 60)470+10)", which equals to "X=370".

In this demonstrational case, the processor 160 utilizes the first boundary BD1b after adjustment and the second boundary BD2b after adjustment to separate the areas A1, A2 and A3 as shown in FIG. 10. Afterward, the touch events TE4-TE6 are recognized by the touch sensor 140 according to the first boundary BD1b, the second boundary BD2b and also the distribution of the areas A1, A2 and A3 as shown in FIG. 10.

Based on aforesaid embodiments, the input interface device 100 is able to dynamically adjust the boundaries for recognizing touches from different fingers. The boundaries can be determined by an arithmetic average coordinate or a weighted average coordinate calculated from two adjacent touch events.

Another embodiment of present disclosure is a non-transitory computer-readable medium. The non-transitory computer-readable medium is configured to store computer program instructions. When the computer program instructions are executed by the processor 160, the computer program instructions cause the processor 160 to perform aforesaid operations as shown in the control method 400 discussed in aforesaid embodiments.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An input interface device comprising:
   a sensing panel;
   a touch sensor, configured to detect a first touch event located in a first area of the sensing panel, and detect a second touch event located in a second area of the sensing panel, the first area and the second area being separated by a first boundary defined across the sensing panel;
   an auxiliary sensor different from the touch sensor, disposed adjacent to the sensing panel and configured to detect an auxiliary input comprising a first environmental parameter different from a parameter detected by the touch sensor; and
   a processor, coupled to the touch sensor and the auxiliary sensor, the processor being configured to:
      determine whether the first boundary needs to be adjusted or not according to the first environmental parameter, wherein the processor compares the first environmental parameter with a threshold value so as to determine whether the first boundary needs to be adjusted or not;
      adjust the first boundary according to the first touch event and the second touch event after determine the first boundary needs to be adjusted according to the first environmental parameter; and
      utilize the first boundary after adjustment to separate the first area and the second area.

2. The input interface device of claim 1, wherein the first touch event in the first area is recognized corresponding to a first finger, the second touch event in the second area is recognized corresponding to a second finger different from the first finger.

3. The input interface device of claim 1, wherein the touch sensor is further configured to detect a third touch event located in a third area of the sensing panel, the second area and the third area are separated by a second boundary defined across the sensing panel, the auxiliary input further comprises a second environmental parameter around the second boundary.

4. The input interface device of claim 3, wherein the processor is further configured to:
   determine whether the second boundary needs to be adjusted or not according to the second environmental parameter;
   selectively adjust the second boundary according to the second touch event and the third touch event; and
   utilize the second boundary after adjustment to separate the second area and the third area.

5. The input interface device of claim 1, wherein the first area and the second area are located at different segments along a first directional axis, the first boundary extends in a direction in parallel with a second directional axis perpendicular to the first directional axis, the first touch event is detected at a first coordinate along the first directional axis, the second touch event is detected at a second coordinate along the first directional axis.

6. The input interface device of claim 5, wherein, the processor calculates an average coordinate from the first coordinate and the second coordinate, the processor adjusts the first boundary according to the average coordinate.

7. The input interface device of claim 5, wherein the auxiliary sensor comprises a first sensor component and a second sensor component, the first sensor component is located in the first area adjacent to the first boundary for generating a first reading of the first environmental parameter, the second sensor component is located in the second area adjacent to the first boundary for generating a second reading of the first environmental parameter, wherein the first reading determines a first weight for the first coordinate and the second reading determines a second weight for the second coordinate, and the processor calculate a weighted average coordinate according to the first coordinate, the second coordinate, the first weight and the second weight.

8. The input interface device of claim 1, wherein the auxiliary sensor comprises a proximity sensor component disposed adjacent to the first boundary, the proximity sensor component is configured to generate a proximity reading of the first environmental parameter, the proximity reading is negatively correlated with a distance between the sensing plane and a finger in front of the proximity sensor component, the processor compares the proximity reading with a proximity threshold value so as to determine whether the first boundary needs to be adjusted or not.

9. The input interface device of claim 1, wherein the auxiliary sensor comprises a temperature sensor component disposed adjacent to the first boundary, the temperature sensor component is configured to generate a temperature reading of the first environmental parameter, the temperature reading is positively correlated with a temperature on the sensing plane around the first boundary, the processor compares the temperature reading with a temperature threshold value so as to determine whether the first boundary is needed to be adjusted or not.

10. The input interface device of claim 1, wherein the auxiliary sensor comprises a grip sensor component disposed adjacent to the first boundary, the grip sensor component is configured to generate a pressure reading of the first environmental parameter, the pressure reading is positively correlated with an external force applied on the sensing plane around the first boundary, the processor compares the pressure reading with a pressure threshold value so as to determine whether the first boundary is needed to be adjusted or not.

11. The input interface device of claim 1, wherein the first boundary is initially defined at a default position, the touch sensor refers the first boundary at the default position to recognize the first touch event and the second touch event before the first boundary is adjusted.

12. A control method, suitable for an input interface device comprising a sensing plane, the control method comprises:
    detecting, by a touch sensor, a first touch event located in a first area of the sensing panel and a second touch event located in a second area of the sensing panel, the first area and the second area being separated by a first boundary defined across the sensing panel;
    detecting, by an auxiliary sensor different from the touch sensor, an auxiliary input comprising a first environmental parameter different from a parameter detected by the touch sensor;
    determining whether the first boundary is needed to be adjusted or not according to the first environmental parameter, wherein the first environmental parameter is compared with a threshold value so as to determine whether the first boundary needs to be adjusted or not;
    adjusting the first boundary according to the first touch event and the second touch event after determine the first boundary needs to be adjusted according to the first environmental parameter; and
    utilizing the first boundary after adjustment to separate the first area and the second area.

13. The control method of claim 12, wherein the first touch event in the first area is recognized corresponding to a first finger, the second touch event in the second area is recognized corresponding to a second finger different from the first finger.

14. The control method of claim 12, further comprising:
    detecting a third touch event located in a third area of the sensing panel, the second area and the third area are separated by a second boundary defined across the sensing panel, the auxiliary input further comprising a second environmental parameter around the second boundary;
    determining whether the second boundary is needed to be adjusted or not according to the second environmental parameter;
    selectively adjusting the second boundary according to the second touch event and the third touch event; and
    utilizing the second boundary after adjustment to separate the second area and the third area.

15. The control method of claim 12, wherein the first area and the second area are located at different segments along a first directional axis, the first boundary extends in a direction in parallel with a second directional axis perpendicular to the first directional axis, the first touch event is detected at a first coordinate along the first directional axis, the second touch event is detected at a second coordinate along the first directional axis.

16. The control method of claim 15, further comprising:
    calculating an average coordinate from the first coordinate and the second coordinate, wherein the first boundary is adjusted according to the average coordinate.

17. The control method of claim 15, further comprising:
    generating a first reading of the first environmental parameter by a first sensor component of the auxiliary sensor located in the first area and adjacent to the first boundary;
    generating a second reading of the first environmental parameter by a second sensor component of the auxiliary sensor located in the second area and adjacent to the first boundary, wherein the first reading determines a first weight for the first coordinate and the second reading determines a second weight for the second coordinate; and
    calculating a weighted average coordinate according to the first coordinate, the second coordinate, the first weight and the second weight.

18. The control method of claim 12, wherein the step of detecting the auxiliary input comprises:
    generating a proximity reading of the first environmental parameter by a proximity sensor component disposed adjacent to the first boundary, the proximity reading is negatively correlated with a distance between the sensing plane and a finger in front of the proximity sensor component, and
    the step of determining whether the first boundary needs to be adjusted or not comprises:
    comparing the proximity reading with a proximity threshold value so as to determine whether the first boundary is needed to be adjusted or not.

19. The control method of claim 12, wherein the step of detecting the auxiliary input comprises:

generating a temperature reading of the first environmental parameter by a temperature sensor component disposed adjacent to the first boundary, the temperature reading is positively correlated with a temperature on the sensing plane around the first boundary, and the step of determining whether the first boundary needs to be adjusted or not comprises:

comparing the temperature reading with a temperature threshold value so as to determine whether the first boundary is needed to be adjusted or not.

20. The control method of claim 12, wherein the step of detecting the auxiliary input comprises:

generating a pressure reading of the first environmental parameter by a grip sensor component disposed adjacent to the first boundary, the pressure reading is positively correlated with an external force applied on the sensing plane around the first boundary, and the step of determining whether the first boundary needs to be adjusted or not comprises:

comparing the pressure reading with a pressure threshold value so as to determine whether the first boundary is needed to be adjusted or not.

21. A non-transitory computer-readable medium comprising computer program instructions, the computer program instructions when executed by a processor cause the processor to perform operations comprising:

detecting, by a touch sensor, or a first touch event located in a first area of a sensing panel and a second touch event located in a second area of the sensing panel, the first area and the second area being separated by a first boundary defined across the sensing panel;

detecting, by an auxiliary sensor different from the touch sensor, an auxiliary input comprising a first environmental parameter different from a parameter detected by the touch sensor;

determining whether the first boundary is needed to be adjusted or not according to the first environmental parameter, wherein the first environmental parameter is compared with a threshold value so as to determine whether the first boundary needs to be adjusted or not;

adjusting the first boundary according to the first touch event and the second touch event after determine the first boundary needs to be adjusted according to the first environmental parameter; and utilizing the first boundary after adjustment to separate the first area and the second area.

* * * * *